3,641,078
METHOD FOR PREPARING BIS(ALKYLDIPHENYL TIN) SULFIDE

Gerrit Johann Meine van der Kerk, Utrecht, and Albert Tempel, Van Houtenlaan, Weesp, Netherlands, assignors to U.S. Philips Corporation, New York, N.Y.
No Drawing. Filed Apr. 23, 1969, Ser. No. 818,777
Claims priority, application Netherlands, Apr. 25, 1968, 6805920
Int. Cl. C07f 7/22; A01n 9/12
U.S. Cl. 260—429.7
4 Claims

ABSTRACT OF THE DISCLOSURE

Bis(alkyldiphenyl tin) sulfides, method of preparing same, fungicidal compositions which contain these compounds as the active constituent and method of preparing the said compositions.

---

It is known that organic compounds of quadrivalent tin have a fungicidal activity and are used, on the basis of this activity, in compositions for controlling moulds in agriculture and horticulture.

Particularly the triphenyl tin compounds, for example, triphenyltin hydroxide and triphenyltin acetate are known as fungicidally active compounds. Other tin compounds which have been proposed for use as an active constituent in fungicidal compositions are trialkyltin compounds, for example, tribuyltin chloride, bis(trialkyltin) compounds, for example, bis-(tributyltin)sulphide and bis(triaryltin) compounds, for example, bis(triphenyltin)sulphide.

The use of the above-mentioned known compounds in composition for controlling moulds in agriculture and horticulture meets with difficulties, which will be described in detail below per group.

(1) Triphenyltin compounds: The chemo-therapeutical index of this group of compounds, that is to say, the ratio between the minimum concentration necessary for killing the parasite and the maximum dose which the plant can tolerate without damage is low.

(2) Trialkyltin compounds: The phytotoxicity is so high that practical application on living plants is not attractive. The fungicidal activity is good and much higher than that of the group of compounds sub 1.

(3) Bis(trialkyltin) compounds: Good fungicidal activity but strongly phytotoxic.

(4) Bis(triaryltin) compounds: The fungicidal activity is insufficient for the compounds to be used in practice. The phytotoxicity is low.

From the above characteristic of the known groups of tin compounds it appears that each group has a combination of favourable and unfavourable properties, in such manner that a good and attractive fungicidal activity is associated with an undesirably high phytotoxicity, and conversely. Group (1) of the groups mentioned above has the most favourable characteristic for practical application and it therefore is not astonishing that representatives of the said group have provided the present commercial products, for example, DU-TER and Brestan.

The invention relates to compounds of the general formula

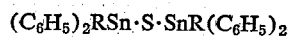

in which formula R is an alkyl group having 3 to 5 carbon atoms. The compounds according to the invention have a very good fungicidal activity and moreover a low phytotoxicity.

From the investigations which have led to the present invention it has appeared that the compounds according to the invention are suitable for controlling various moulds, for example, *Fusarium culmorum, Venturia inaequalis, Candida albicans, Epidermophyton floccosum, Microsporum canis, Trychophyton mentagrophytes* and *Trychophyton rubrum*.

Excellent fungicidal properties in combination with a low phytotoxicity were found in particular in bis-(butyldiphenyltin) sulphide.

As examples of interesting compounds of the invention may furthermore be mentioned: bis-(propyldiphenyltin) sulphide and bis-(isobutyldiphenyltin) sulphide.

A comparison of the biological properties of the compounds according to the invention with the known tin compounds mentioned in the preamble, and preferably with the triphenyltin compounds since the latter have the comparatively most favourable properties, proves that the compounds according to the present invention have the most suitable and surprising combination of a good fungicidal activity and low phytotoxicity. The favourable fungicidal activity of the compounds according to the invention has been found inter alia from a biological evaluation experiment in which tomato leaves infested with *Phytophtora infestans* were treated with various concentrations of the active compounds. It was tested at what instants after infection what percentage of the leaf surface was infested.

The low phytotoxicity was found in an experiment in which cucumber plants and potato leaves were sprayed with various concentrations of the active compounds. It was tested in how far the cucumber plants and potato leaves were damaged.

It has furthermore been found that the compounds according to the invention have a surprisingly low toxicity. This was found inter alia in a series of experiments in which the compounds according to the invention were administered to mice in various doses, both orally and intraperitoneally.

It was investigated in what dose a 50% mortality of the experimental animals occurred during a period of fourteen days succeeding the instant of administration ($LD_{50}$ value). The same series of experiments was carried out with the formulation of triphenyltin hydroxide known commercially as DU-TER. The results of the two series of experiments demonstrated that the $LD_{50}$ values of the compounds according to the invention are the 15-fold of the corresponding value of triphenyltin hydroxide.

On the basis of the above-mentioned favourable biological properties, the compounds according to the invention may advantageously be used in controlling or preventing mould infections. For example, the compounds according to the invention are to be considered for the following applications:

(1) Controlling mould infections in agricultural and horticultural crops, for example, in fruit (apples, pears, peaches, grapes, citrus, banana and tomato), bulbous and tuberous plants (flower bulbs, potatoes and beets), in cereals (oats, wheat, rice), in tropical cultures (cotton, tobacco, coffee and tea), in ornamental plants (roses, carnation, chrysanthemum) and furthermore as agents for the treatment of seeds and plants (cereals, beets, horticultural seeds, cotton legumes, potatoes, and cuttings).

(2) Preventing and controlling mould infections in man and animal.

(3) Protection of materials (for example, wood, paper, synthetic materials and paint) against infestation by moulds.

Due to the low phytotoxicity and toxicity of the compounds according to the invention, undesired side phenomena, for example, damage to culture crop and toxicity phenomena in man and animal, do not occur in the abovementioned application.

The compounds according to the invention can be processed in known manner to the conventional compositions used in the above described fields of application, for example, dust, wettable powder, liquid concentrate, seed disinfectant, ointment, cream and paste.

In all these compositions, the active compound according to the invention is mixed with or dissolved or dispersed in inert solid or liquid carriers, if desired while adding auxiliary substances, for example, surface-active substances, for example, wetting agents and emulsifiers, adhesives and dispersion agents.

As examples of compositions according to the invention, may be mentioned:

(1) Dusts which contain 1 to 50% by weight of active constituent mixed with an inert solid carrier, for example, infusorial earth, talcum, kaolin, dolomite, pipe clay, gypsum, chalk, bentonite, attapulgite, or mixtures of these and similar carriers, whether or not in combination with stabilizers.

(2) Wettable powders with from 10 to 80% by weight of active substance, in combination with from 10 to 80% by weight of solid inert carrier, as described above sub 1, from 1–10% by weight of dispersion agents, for example, lignin sulphonates and alkyl naphthalene bisulphonates, and perferably also with from 1–5% by weight of wetting agent, for example, fatty alcohol sulphates, alkyl aryl sulphonates or condensation products of fatty acids, which are known commercially, for example, as Igepon.

(3) Liquid concentrates, for example, miscible oils and liquid formulations.

Dissolved in miscible oils in the active compound or finely divided in a poorly water-miscible solvent in the presence of an emulsifier. Suitable solvents are, for example, the poorly water-miscible ketones, xylene, toluene and petroleum distillates which are rich in aromates. As emulsifiers may be used, for example, alkyl phenol polyglycol ether, polyoxyethylene sorbitan esters of fatty acids and polyoxyethylene sorbitol esters of fatty acids.

Miscible oils contain from 6 to 50% by weight of active substance, from 1 to 10% by weight of emulsifier and the remainder solvents. In a liquid concentrate, which is known as "liquid formulation," the active substance is dissolved, if desired in the presence of an emulsifier, in a water-miscible solvent, for example, glycols, for example, ethyl glycol. When diluting this concentrate with water shortly prior to or during spraying the crop, a fine dispersion of the active constituent in water is formed.

(4) Seed disinfectant: Seed disinfectants contain from 0.5–10% by weight of active substance, in combination with, for example, kaolin in a small quantity of adhesive.

(5) Liquid seed disinfectant: In a liquid seed disinfectant in the active substance in a quantity of from 0.5 to 10% by weight, dissolved in a suitable solvent, for example, glycols.

It has been found more in particular that the compounds according to the invention may advantageously be used in the above described liquid formulation. Not only can the liquid compounds according to the invention by processed to a liquid formulation in a simple and economically attractive manner, but moreover the active compounds, in this preferred embodiment of a composition according to the invention, show an intensification of the fungicidal effect, without the phytotoxicity increasing noteworthily. The composition of a liquid formulation may vary between wide limits. As an example of a liquid formulation according to the invention may be mentioned:

(a) Liquid formulation with 10% by weight of active material.

| Composition: | Gms. |
|---|---|
| Bis - (diphenylbutyltin)sulphide | 10 |
| Alkyl phenol polyglycol ether | 4 |
| Dimethyl formamide | 20 |
| Ethyl glycol | 66 |
| | 100 |

(b) Liquid formulation with 25% w./v. of active material.

| Composition: | Gms. |
|---|---|
| Bis-(diphenylbutyltin) sulphide | 25 |
| Alkyl phenol polyglycol ether | 10 |
| Cyclohexanone | 69 |
| | [1] 104 |

[1] Equals 100 mls.

The liquid concentrate is not used as such in controlling fungii in agriculture and horticulture but prior to or during use it is mixed with water in which a finely divided aqueous emulsion of the compounds according to the invention is obtained, which is then sprinkled, nebulized, atomized, or sprayed in the conventional manner on the crop to be treated.

Generally, aqueous dispersions are to be considered which contain from 0.03 to 3% by weight of active substance, in a dose of from 50 to 1000 gms. of active substance per hectare and preferably from 100 to 300 gms. of active substance per hectare. It is furthermore pointed out that the compositions according to the invention may be combined with other active substances to widen the effective spectrum or to reach synergistic effects.

It has been found that the active substance mentioned below are suitable for being incorporated in the compositions according to the invention:

(1) Fungicidal compounds

For example:
   organic mercury compound
for example:
   phenyl mercury acetate and methyl mercury,
   cyano guanide.
   dialkyldithiocarbamates:
for example:
   zincdimethyldithiocarbamate,
   alkylenebisdithiocarbamates:
for example:
   zincdimethyldithiocarbamate,
   alkylenebisdithiocarbamates:
for example:
   zincethylenebisdithiocarbamate,
   zinc propylenebisdithiocarbamate,
   manganeseethylenebisdithiocarbamate, and
   combination compositions of zinc- and manganese ethylene bisdithiocarbamate,
   dinitro phenols:
for example:
   2,4 dinitro-6-(2-octyl)phenylcrotonate,
   2,4 dinitro-6-sec. butylphenylacrylate and furthermore
   1 - [bis(dimethylamino)phosphoryl] - 3 - phenyl-5-amine 1,2,4-triazole,
   6-methylquinoxaline 2,3-dithiocarbamate
   1,4-dithio-anthraquinone-2,3-dicarbonitrile,
   n-trichloro-methyl-thiophthalimide,
   n-trichloro-methyl-triotetrahydrophthalimide
   N (1,1,2,2 - tetrachloroethylthio)tetrahydrophthalimide.
   N-dichlorofluoromethylthio N - phenyl-N'-dimethylsulphonyl diamide and tetrachloroisophthalonitrile,
as well as insecticidal compounds: for example, chlorinated hydrocarbons.

For example:

2,2 bis(p-chlorophenyl) - 1,1,1 - trichloroethane and hexachloro - epoxy-octahydro-dimethanophthalene, organic phosphorous compounds, for example:

O,O diethyl-O-p-nitrophenyl-phosphorthioate,
O,O dimethyl - S - 1,2 - di(ethoxycarbamyl)ethyl-phosphordithioate and
O,O diethyl-O,2-(ethylthio)ethyl-phosphorthioate and carbamates, for example, methylnaphthylcarbamate.

It has been found in particular that compositions according to the invention which contain, in addition to the tin compounds, a substance having a growth regulating activity, for example, alkylene bisdithiocarbamates and preferably contain manganese ethylene bisdithoocarbamate as the active constituents, are excellently suitable for controlling moulds in living plants.

The compounds according to the invention are new substances which can be prepared in a manner which is known for similar compounds or in a manner analogous thereto.

For example, the compounds according to the invention may be prepared by reacting a compound of formula $$Ph_2AlkSnQ$$

in which formula

Ph is a phenyl group,
Alk an alkyl group having 1 to 6 carbon atoms and
Q is a halogen atom, a hydroxy group or an alkoxy group with a compound of the formula $M_2S$ in which formula M is a hydrogen atom, a metal atom of the group $NH_4$.

The starting products of the above-mentioned method can be prepared according to known methods or according to methods analogous thereto. For example, a starting product of the formula $Ph_2AlkSnCl$, in which formula Ph is a phenyl group, and Alk is an alkyl group having 3 to 5 carbon atoms, can be obtained by reacting a compound of the formula $Ph_3SnCl$ with a reagent of the formula AlkMgX, in which formula Alk is an alkyl group having 3 to 5 carbon atoms, then reacting the resulting reaction product which may be represented by the formula $Ph_3SnAlk$ in which formula Ph and Alk have the above-mentioned meanings, with halogen, for example, iodine. By saponification of the resulting reaction product, the corresponding hydroxide or oxide can be obtained.

The compounds according to the invention may also be prepared according to a method found by applicants. This new method according to the invention is characterized in that a compound of the formula $PhSnX_2$, in which formula Ph is a phenyl group and X is a halogen atom and preferably a chlorine atom, is reacted with trialkyl aluminium, in which the alkyl group contains 3 to 5 carbon atoms, and then with an alkali metal sulphide.

The alkali metal sulphide is preferably added in the form of an aqueous solution.

The reaction with the trialkyl aluminium reagent is carried out in the presence of solvents. Suitable solvents are, for example, ethers and chlorinated hydrocarbons, for example, diethyl ether, dibutyl ether, tetrahydrofurane and chlorobenzene.

The starting product of the method according to the invention can be obtained by reacting a compound of the formula $Ph_4Sn$, in which formula Ph is a phenyl group, with a compound of the formula $SnX_4$, in which formula X is a halogen atom and preferably a chlorine atom. The resulting reacting mixture in a preferred embodiment of the method according to the invention is immediately treated without preceding purification or insulation of the reaction product with the trialkyl aluminium reagent and then with the alkali metal sulphide.

It has furthermore been found that the alkylation with trialkyl aluminium can advantageously be carried out in the presence of a complex former for the trialkyl aluminium. Suitable complex formers are, for example, tertiary amines, for example, triethylamine and pyridine. By the addition of a complex former, the yield of the desired final product is considerably increased. It has been found inter alia that in preparing bis-(butyl diphenyl tin) sulphide an increase of the yield by 50% can be obtained.

The quanity of complex former to be added may vary within wide limits. Good results are obtained in a weight ratio complex former-trialkyl aluminium which varies from 5 to 1 and 1 to 2.

The complex former may be added to the reaction mixture as such, it may also be added in the form of a solution, for example, of a solution in ether, for example, butyl ether or tetrahydrofurane.

In order that the invention may be readily carried into effect, it will now be described in greater detail, with reference to the following specific examples.

(1) Preparation of diphenylbutyltin chloride 137.5 gms. (0.4 mol) of diphenyl tin chloride are taken up in 240 mls. of dibutylether and combined with 120 gms. (1.18 mol) of triethylamine in a three-necked flask provided with stirrer, cooler and dropping funnel.

52.3 gms. (0.26 mol) of tributylaluminium and 100 mls. of dibutyl ether are then added dropwise to this mixture, and the whole is kept at a temperature of 60–70° C. for approximately one hour. The reaction mixture is then cooled, the triethylamine evaporated in vacuo, and the residue treated with 150 mls. of 4 N HCl. The insoluble aluminium compounds are filtered off and the filtrate is treated with 175 mls. of 4 N NaOH. The mixture is then washed with diethyl ether, after which 25 gms. of acetic acid are added to the resulting bright ether filtrate. After evaporating the organic solvents, the resulting crystalline substance is filtered off.

Yield 101 gms. diphenylbutyltin acetate. Melting point 100° C.

The acetate is taken up in 1 l. of diethyl ether and the mixture is stirred with 250 mls. of 4 N NaOH. The alkali layer is separated from the reaction mixture, washed a few times with diethyl-ether and the combined ether extract are then treated with 250 mls. of 4 N $H_4Cl$. The layers are separated again and the acid layer is washed with ether. Yield after evaporation: 105 gms. of diphenylbutyltin chloride.

(2) Preparation of bis-(diphenylbutyltin)sulphide 408 gms. (1.1 mol) of diphenyl butyl tin chloride are taken up in 750 mls. of diethyl ether and stirred vigorously with 135 gms. (0.56 mol) of $Na_2S.9H_2O$ for approximately 20 minutes. The reaction mixture is separated into an ether layer and a water layer, after which the ether layer is washed with water and the water layer is washed with diethyl ether. The combined ether fractions are dried on $Na_2SO_4$ and evaporated after filtration. Yield 301.4 gms. of bis-(diphenylbutyltin) sulphide ($n_D^{20}=1.6316$).

(3) Preparation of diphenylpropyltin chloride 35.1 gms. of triphenyl propyl tin are taken up in 75 mls. of diethyl ether and transferred to a three-necked flask provided with stirrer, dropping funnel and cooler. A solution of 22.7 gms. of iodine in 150 mls. of diethyl ether is added dropwise to this mixture and the whole is stirred at room temperature for a few hours. The reaction product is filtered and the filtrate evaporated. From the resulting mixture of diphenyl propyltiniodide and phenyl iodide, the last-mentioned component is removed by heating the mixture in vacuo to 100° C.

The resulting diphenyltin iodide is taken up in 200 mls. of diethyl ether and 6 gms. of acetic acid are added to this mixture. After evaporating the ether solution and recrystallising the residue from 250 mls. of petroleum ether, 28.3 gms. of pure diphenylpropyltin acetate are obtained. The acetate is taken up in 250 mls. of ether and stirred with 75 mls. of 4 N NaOH. The alkali layer is separated from the reaction mixture, washed with diethyl ether and the combined ether fractions are shaken with 75 mls of 4 N HCl. The layers are separated again and the acid layer is washed with ether. Yield after evaporation: 29.4 gms. of diphenylpropyltin chloride.

(4) Preparation of bis-(diphenylpropyltin)sulphide 27.3 gms. of diphenylpropyltin chloride are taken up in 75 mls. of diethyl ether and stirred vigorously for 20 minutes with 9 gms. of $Na_2S \cdot 9H_2O$. The resulting mixture is processed in the same manner as described in Example 2. Yield 19.7 gms. of bis(diphenylpropyltin) sulphide. Melting point 52° C.

(5) Preparation of bis-(diphenylbutyltin)sulphide

A mixture of 4.27 gms. (0.01 mol) of tetraphenyltin and 2.6 gms. (0.01 mol) of tintetrachloride is heated at 180° C. for 2 hours. 20 mls. of chlorobenzene and 6 gms. of triethyl amine are added to this mixture, after cooling, after which 1.98 gms. of tributyl aluminium in 10 ml. of chlorobenzene are added dropwise. After processing the reaction mixture as described in Example 1, 4.6 gms. of diphenylbutyltin chloride are obtained which are then converted, in the manner described in Method 2, into bis-(diphenyl butyltin) sulphide.

We claim:
1. The method of preparing compounds of the formula

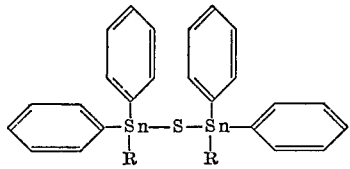

wherein R is alkyl of 3–5 carbon atoms inclusive comprising first reacting a compound of the formula $Ph_2SnX_2$ wherein Ph is phenyl and X is halogen with trialkyl aluminum wherein each alkyl moiety contains from 3 to 5 carbon atoms inclusive and then treating the resultant reaction product with an alkali metal sulfide.

2. The method of claim 1 wherein a complex former is employed along with the trialkyl aluminum.

3. The method of preparing compounds of the formula

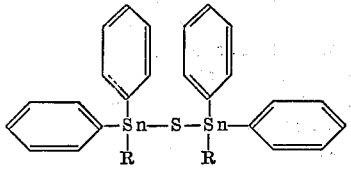

wherein R is alkyl of 3–5 carbon atoms inclusive which comprises first reacting a compound of the formula $Ph_4Sn$ wherein Ph is phenyl with a compound of the formula $SnX_4$ wherein X is halogen, treating the resultant reaction product first with trialkyl aluminum, the alkyl moieties of which contain 3 to 5 carbon atoms inclusive and then with an alkali metal sulfide.

4. The method of claim 3 wherein a complex former is employed along with the trialkyl aluminum.

References Cited

UNITED STATES PATENTS

| | | | |
|---|---|---|---|
| 3,424,775 | 1/1969 | Ito et al. | 260—429.7 |
| 3,454,569 | 7/1969 | Gloskey | 260—429.7 X |

FOREIGN PATENTS

| | | | |
|---|---|---|---|
| 13,259 | 6/1965 | Japan | 260—429.7 |
| 13,260 | 6/1965 | Japan | 260—429.7 |
| 13,261 | 6/1965 | Japan | 260—429.7 |

TOBIAS E. LEVOW, Primary Examiner

W. F. W. BELLAMY, Assistant Examiner

U.S. Cl. X.R.

424—288